United States Patent
Christnacher et al.

(10) Patent No.: US 12,448,519 B2
(45) Date of Patent: Oct. 21, 2025

(54) MIXTURE OF REACTIVE DYES AND THEIR USE FOR THE DYEING OR PRINTING OF TEXTILE FIBRE MATERIALS

(71) Applicant: Archroma (Switzerland) GmbH, Pratteln (CH)

(72) Inventors: Hubert Jean-Luc Christnacher, Dietwiller (FR); Fanny Ehret, Reiningue (FR); Michael Nicollet, Village-Neuf (FR); Jean-Christophe Graciet, Village-Neuf (FR); Georg Roentgen, Freiburg (DE)

(73) Assignee: Archroma (Switzerland) GmbH, Pratteln (CH)

( * ) Notice: Subject to any disclaimer, the term of this patent is extended or adjusted under 35 U.S.C. 154(b) by 0 days.

(21) Appl. No.: 17/921,169

(22) PCT Filed: Apr. 26, 2021

(86) PCT No.: PCT/EP2021/060849
§ 371 (c)(1),
(2) Date: Oct. 25, 2022

(87) PCT Pub. No.: WO2021/219556
PCT Pub. Date: Nov. 4, 2021

(65) Prior Publication Data
US 2023/0167304 A1    Jun. 1, 2023

(30) Foreign Application Priority Data
Apr. 27, 2020  (EP) .................................... 20171675

(51) Int. Cl.
*C09B 67/00* (2006.01)
*C09B 29/30* (2006.01)
(Continued)

(52) U.S. Cl.
CPC .......... *C09B 67/0045* (2013.01); *C09B 29/30* (2013.01); *C09D 11/033* (2013.01);
(Continued)

(58) Field of Classification Search
CPC . C09B 67/0045; C09B 29/30; C09B 62/4413; C09B 62/51; C09D 11/033;
(Continued)

(56) References Cited

U.S. PATENT DOCUMENTS

| | | | | |
|---|---|---|---|---|
| 4,341,699 | A * | 7/1982 | Tezuka | C09B 62/4413 534/638 |
| 6,086,636 | A * | 7/2000 | Mheidle | D06P 5/001 8/930 |
| 8,911,509 | B2 | 12/2014 | Tzikas et al. | |
| 2011/0041265 | A1 | 2/2011 | Lin et al. | |
| 2017/0369721 | A1 | 12/2017 | Komatsu et al. | |

FOREIGN PATENT DOCUMENTS

| | | |
|---|---|---|
| CN | 102753627 | 10/2012 |
| CN | 107532008 | 1/2018 |

(Continued)

OTHER PUBLICATIONS

STIC Search Report dated Mar. 7, 2024.*
(Continued)

*Primary Examiner* — Eisa B Elhilo
(74) *Attorney, Agent, or Firm* — Christensen, Fonder, Dardi & Herbert PLLC; Elizabeth A. Gallo

(57) ABSTRACT

A dye mixture comprising at least one dye of formula (formula) and at least one dye of formula (formula), wherein $R_1$ is hydrogen or $C_1$-$C_4$alkyl, $R_2$ is hydrogen or $C_1$-$C_4$alkyl, $C_1$-$C_4$alkoxy or sulfo, $Q_1$ is a fibre-reactive radical of formula $—(CH_2)_{2-3}—SO_2—Y_2$ (3a) or $—(CH_2)_{2-3}—O—(CH_2)_{2-3}—SO_2—Y_3$ (3b), $Q_2$ has the meaning of $Q_1$, or is hydrogen or $C_1$-$C_4$alkyl, $X_1$ and $X_2$ are each independently of the other halogen, 3-carboxypyridin-1-yl or 3-carbamoylpyridin-1-yl, $Y_1$, $Y_2$ and $Y_3$ are each independently of the others vinyl or a radical $—CH_2—CH_2—U$ and U is a group removable under alkaline conditions, $Z_1$ and $Z_2$ are each independently of the other $—SO_2$-Y, wherein Y is vinyl or a radical $—CH_2—CH_2—U$ and U is a group removable under alkaline conditions, M is hydrogen, an alkali metal or one equivalent of an alkaline earth metal, k and n are each independently of the other the number 0, 1 or 2, l and q are each independently of the other the number 0 or 1, m is the number 0 or 1, and wherein the diazo component of the dye of formula (1) and the diazo component of the dye of formula (2) each independently of the other are a benzene radical or a naphthyl radical, are suitable especially for the dyeing or printing of cellulosic fibre materials, exhibit a good build-up, a good fixation rate and good washing off properties of the unfixed dyes, and good all-round fastness properties.

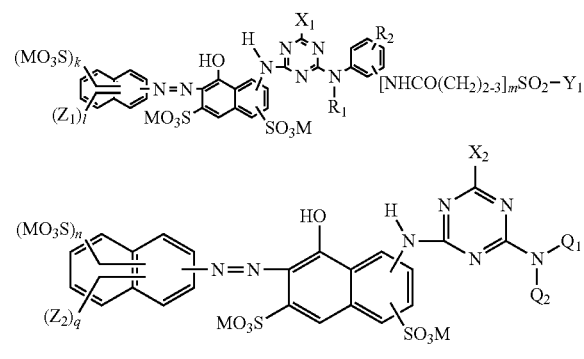

19 Claims, No Drawings

(51) Int. Cl.
  *C09B 67/22* (2006.01)
  *C09D 11/033* (2014.01)
  *C09D 11/037* (2014.01)
  *C09D 11/328* (2014.01)
  *D06P 1/06* (2006.01)
  *D06P 3/66* (2006.01)
  *D06P 5/30* (2006.01)

(52) U.S. Cl.
  CPC .......... *C09D 11/037* (2013.01); *C09D 11/328* (2013.01); *D06P 1/06* (2013.01); *D06P 3/666* (2013.01); *D06P 5/30* (2013.01)

(58) Field of Classification Search
  CPC ....... C09D 11/037; C09D 11/328; D06P 1/06; D06P 3/666; D06P 5/30; D06P 1/382; D06P 3/663
  USPC ............................................................ 8/449
  See application file for complete search history.

(56) References Cited

FOREIGN PATENT DOCUMENTS

| | | | |
|---|---|---|---|
| GB | 1576237 | 10/1980 | |
| JP | S603109 B2 | 1/1985 | |
| TW | I544038 B | 8/2016 | |
| WO | WO 2005052063 A2 * | 6/2005 | |
| WO | WO 2005090485 A1 * | 9/2005 | ............. C09B 67/00 |
| WO | WO 2016180641 A1 * | 11/2016 | ............. C09B 67/22 |

OTHER PUBLICATIONS

Examination Report, Intellectual Property India, Application No. 202217057195, dated Dec. 12, 2023, 5 pages.

First Office Action, State Intellectual Property Office of PRC, Application No. 202180031372.9, dated Dec. 12, 2023, 5 pages.

* cited by examiner

MIXTURE OF REACTIVE DYES AND THEIR USE FOR THE DYEING OR PRINTING OF TEXTILE FIBRE MATERIALS

This application is the National Phase of International Application PCT/EP2021/060849 filed Apr. 26, 2021 which designated the U.S. and which claims priority to EP 20171675.0 filed Apr. 27, 2020. The noted applications are incorporated herein by reference.

The present invention relates to mixtures of reactive dyes that are suitable for the dyeing or printing of nitrogen-containing or hydroxy-group-containing fibre materials and yield on such materials dyeings or prints having a good build-up behaviour, a high fixation rate and good washing off properties of the unfixed dyes, as well as good all-round fastness properties. The present invention also relates to new reactive dyes. Furthermore, the present invention relates to a method for the dyeing or printing of nitrogen-containing or hydroxy-group-containing fibre materials, wherein the reactive dye mixtures and reactive dyes according to the invention are used.

Over the past years, many countries have committed to improve the quality of the environment by saving natural resources and reducing the emission of substances which are harmful to the climate. Funds are provided by the governments to support the industry in achieving these goals. The consumer is asking for environmentally friendly textile products which are produced in accordance with highest ecological standards. Brands and retailers are conveying these demands into real requirements and textile manufacturers are continuously improving their production excellence by investing in modern equipment and selecting environmentally friendly chemical substances.

As a result, there is a huge demand for novel reactive dyes and dye mixtures that are suitable for the reproducible dyeing and printing of fibre materials which fulfill highest ecological and economical requirements while still providing dyeings of the desired colour shades with good fastness properties, such as wash and water fastness and perspiration fastness. Suitable reactive dyes should provide a unique combinability and a low sensitivity to various dyeing parameters. Furthermore, they should have sufficient substantivity and at the same time have good ease of washing off of unfixed dye. They should also exhibit a good tinctorial yield and high reactivity, the objective being to provide especially dyeings having good build-up properties and high degrees of fixing. In many cases, the build-up behaviour of reactive dyes is insufficient to meet the demands being made, especially when dyeing very deep shades.

The present invention is therefore based on the problem of providing new mixtures of reactive dyes that are suitable especially for the reproducible dyeing and printing of fibre materials in the desired colour shades and fulfill the above indicated requirements to the highest possible extent. The dye mixtures should also yield dyeings having good build-up properties, high fixation rates and good washing off properties of the unfixed dyes, and good all-round fastness properties, for example fastness to light and to wetting.

The present invention accordingly relates to a dye mixture comprising at least one dye of formula

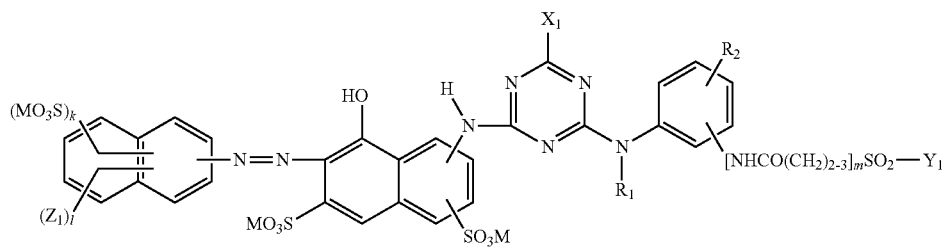

(1)

and at least one dye of formula

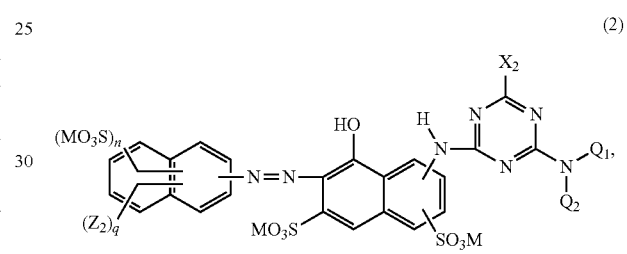

(2)

wherein
$R_1$ is hydrogen or $C_1$-$C_4$alkyl,
$R_2$ is hydrogen or $C_1$-$C_4$alkyl, $C_1$-$C_4$alkoxy or sulfo,
$Q_1$ is a fibre-reactive radical of formula $$—(CH_2)_{2-3}—SO_2—Y_2 \quad (3a)$$

or $$—(CH_2)_{2-3}—O—(CH_2)_{2-3}—SO_2—Y_3 \quad (3b),$$

$Q_2$ has the meaning of $Q_1$, or is hydrogen or $C_1$-$C_4$alkyl,
$X_1$ and $X_2$ are each independently of the other halogen, 3-carboxypyridin-1-yl or 3-carbamoylpyridin-1-yl,
$Y_1$, $Y_2$ and $Y_3$ are each independently of the others vinyl or a radical —$CH_2$—$CH_2$—U and U is a group removable under alkaline conditions,
$Z_1$ and $Z_2$ are each independently of the other —$SO_2$—Y, wherein Y is vinyl or a radical —$CH_2$—$CH_2$—U and U is a group removable under alkaline conditions,
M is hydrogen, an alkali metal or one equivalent of an alkaline earth metal,
k and n are each independently of the other the number 0, 1 or 2,
l and q are each independently of the other the number 0 or 1,
m is the number 0 or 1, and
wherein the diazo component of the dye of formula (1) and the diazo component of the dye of formula (2) each independently of the other are a benzene radical or a naphthyl radical.

The dyes of formulae (1) and (2) are fiber reactive, i.e. the dyes of formulae (1) and (2) contain at least two fibre-reactive substituents.

The dye mixtures according to the invention comprise at least one dye of formula (1) and at least one dye of formula (2). In one embodiment of the present invention, the dye mixtures comprise at least one dye of formula (1), e.g. one, two or three, preferably one dye of formula (1), and at least one dye of formula (2), e.g. one, two or three, preferably one dye of formula (2).

In one embodiment the dyes of formula (1) contain at least 3, preferably 3 or 4, and especially 4 sulfo groups. In another embodiment the dye of formula (2) contains at least 3, preferably 3 or 4, and especially 4 sulfo groups. Sulfo groups —$SO_3M$ are present either in free acid form (M is hydrogen) or, preferably, in salt form. Suitable salts are, for example, alkali metal or alkaline earth metal salts. Further salts which come into consideration are ammonium salts, salts of an organic amine, or mixtures thereof. Examples that may be mentioned are sodium, lithium, potassium or ammonium salts, a mono-, di- or tri-ethanolamine salt or mixed Na/Li or Na/Li/$NH_4$ salts.

As $C_1$-$C_4$alkyl there come into consideration for $R_1$ and $Q_2$ each independently of the other, for example, methyl, ethyl, propyl, isopropyl, n-butyl, sec-butyl, tert-butyl and isobutyl, preferably methyl and ethyl, and more preferably ethyl.

As $C_1$-$C_4$alkyl there comes into consideration for $R_2$, for example, methyl, ethyl, propyl, isopropyl, n-butyl, sec-butyl, tert-butyl and isobutyl, preferably methyl and ethyl, and more preferably methyl.

As $C_1$-$C_4$alkoxy there comes into consideration for $R_2$, for example, methoxy, ethoxy, n-propoxy, isopropoxy, n-butoxy and isobutoxy, preferably methoxy and ethoxy, and more preferably methoxy.

As halogen there come into consideration for $X_1$ and $X_2$ each independently of the other e.g. fluorine, chlorine and bromine, preferably fluorine and chlorine.

As leaving group U of the radicals Y, $Y_1$, $Y_2$ and $Y_3$ there come into consideration each independently of the others, for example, —Cl, —Br, —F, $OSO_3M$, —$SSO_3M$, —OCO—$CH_3$, —$OPO_3M_2$, —OCO—$C_6H_5$, —$OSO_2$—$C_1$-$C_4$alkyl or —$OSO_2$—N($C_1$-$C_4$alkyl)$_2$. U is preferably a group of the formula —Cl, —$OSO_3M$, —$SSO_3M$, —OCO—$CH_3$, —OCO—$C_6H_5$ or —$OPO_3M_2$, especially —Cl or —$OSO_3M$, wherein M has the meanings given above.

In a preferred embodiment the diazo component of the dye of formula (1) and the diazo component of the dye of formula (2) each are a naphthyl radical.

In one embodiment I in formula (1) is the number 0. In another embodiment q in formula (2) is the number 0. In a preferred embodiment I and q are both the number 0.

In a certain embodiment m in formula (1) is the number 0.

In one embodiment of the inventive mixtures the dye of formula (1) is a dye of formula

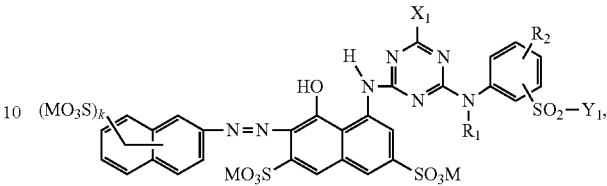

(1a)

wherein
$R_1$, $R_2$, $X_1$, $Y_1$, M and k each have the meanings and preferred meanings given above.

In another embodiment of the inventive mixtures the dye of formula (2) is a dye of formula

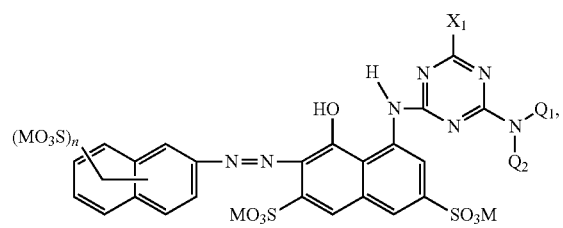

(2a)

wherein
$Q_1$, $Q_2$, $X_2$, M and n each have the meanings and preferred meanings given above.

In one embodiment k in formula (1) is the number 1 or 2, preferably 2. In another embodiment n in formula (2) is the number 1 or 2, preferably 2. In a preferred embodiment k and n each independently of the other are the number 1 or 2, preferably 2.

In a certain embodiment of the inventive mixtures $R_2$ is hydrogen or sulfo, preferably hydrogen.

Preferably, $X_1$ and $X_2$ are halogen, for example, fluorine or chlorine. In one of such preferred embodiment $X_1$ and $X_2$ are chlorine. In another of such embodiment $X_1$ is chlorine and $X_2$ is fluorine. In yet another embodiment $X_1$ is fluorine and $X_2$ is chlorine. In a further embodiment $X_1$ and $X_2$ are fluorine. Particularly, $X_1$ and $X_2$ are chlorine.

Preferably, $Y_1$, $Y_2$ and $Y_3$ are each independently of the others vinyl or a radical —$CH_2$—$CH_2$—U and U means Cl or —$OSO_3M$, wherein M has the meanings given above.

In a preferred embodiment $Q_1$ and $Q_2$ are each a fibre-reactive radical of formula (3a).

The dye of formula (1) in its free acid form is, for example, a dye of the formula

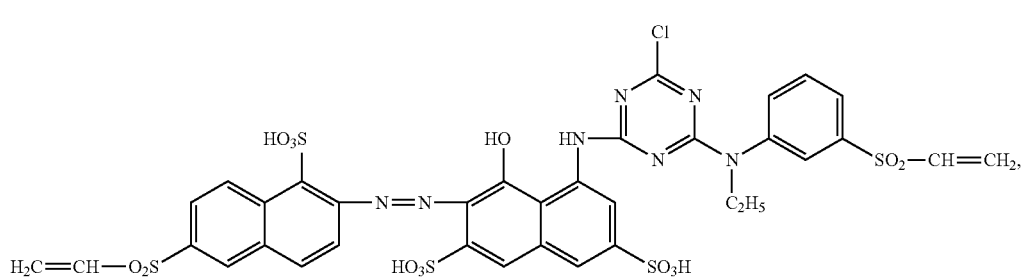

(101)

-continued
(102)
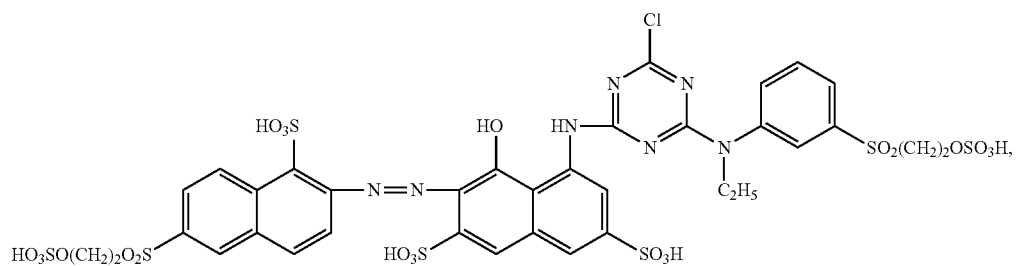
(103)
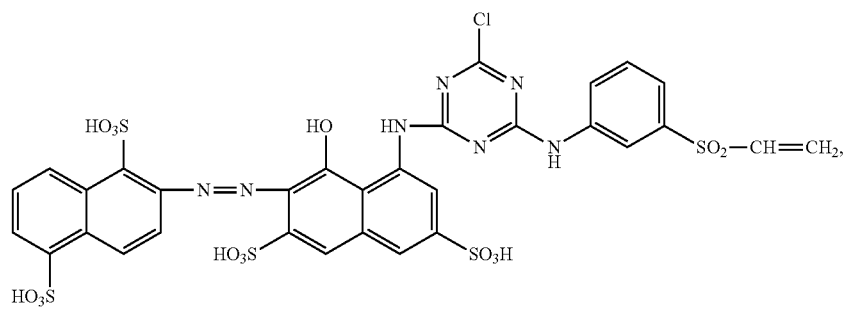
(104)
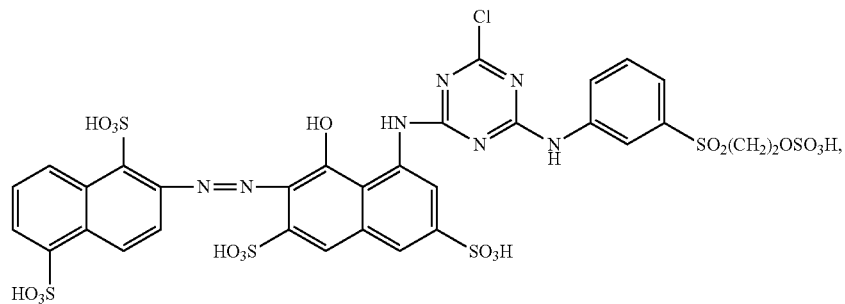
(105)
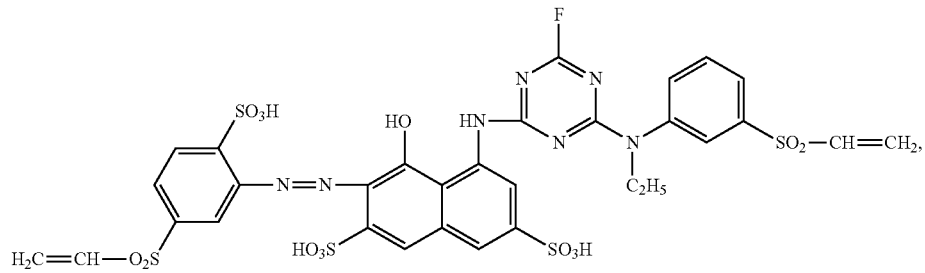
(106)
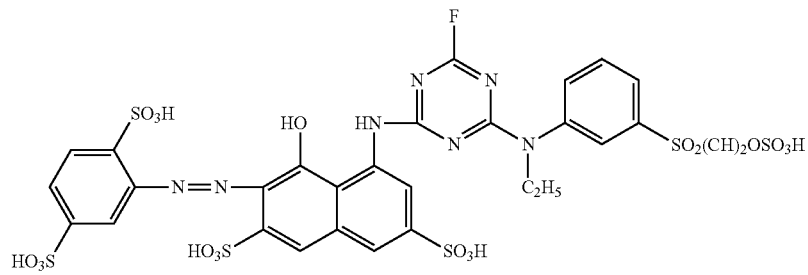

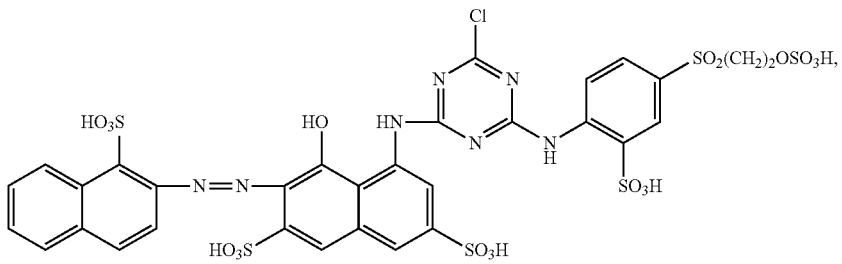
(107)
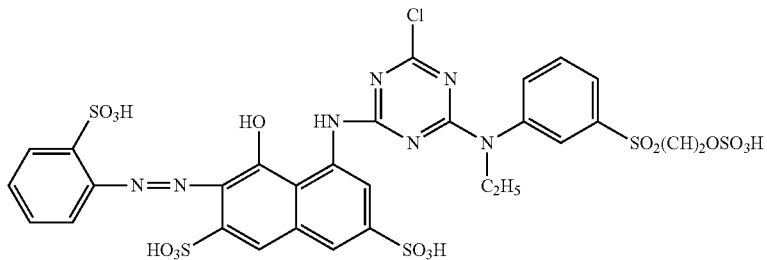
(108)
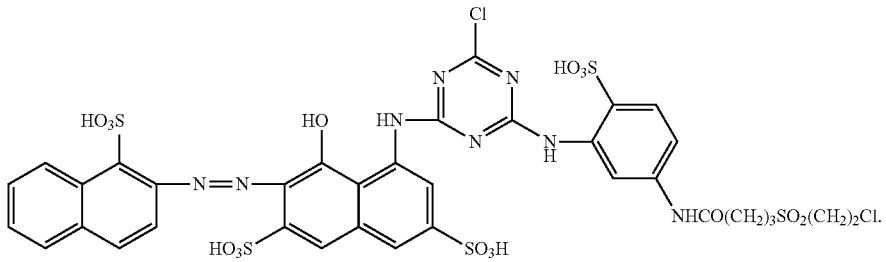
(109)
In one embodiment the dye mixture according to the present invention comprises as the dye of formula (1) the dye of formula (103) and/or (104).
The dye of formula (2) in its free acid form is, for example, a dye of the formula
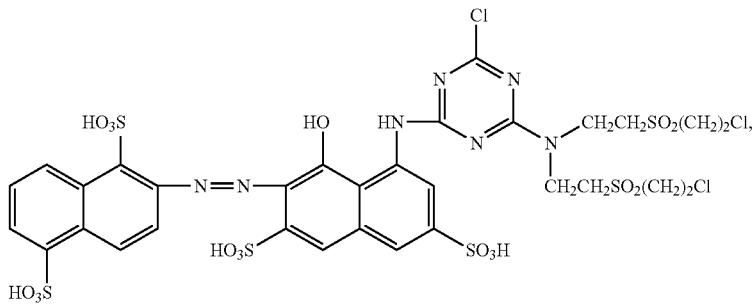
(201)
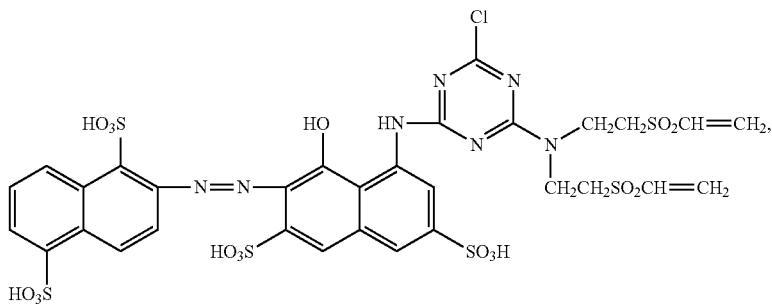
(202)

-continued (203)
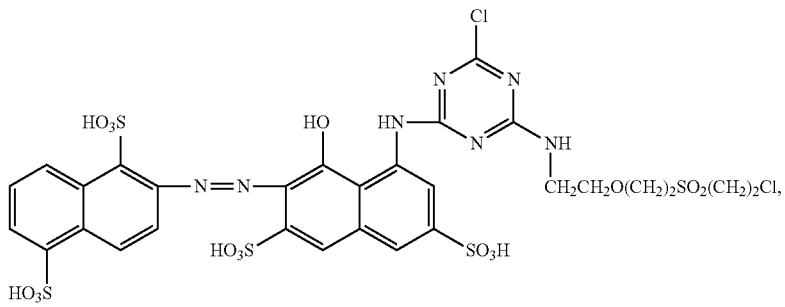

(204)
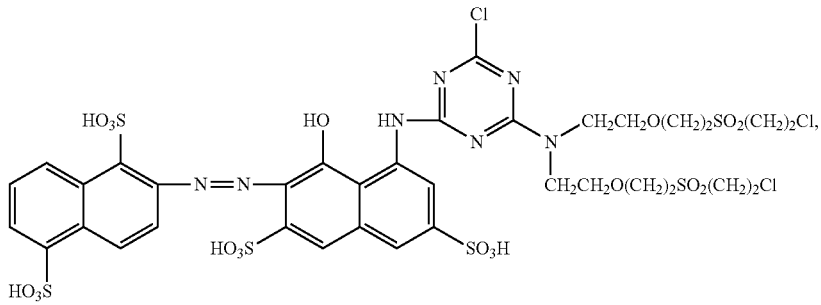

(205)
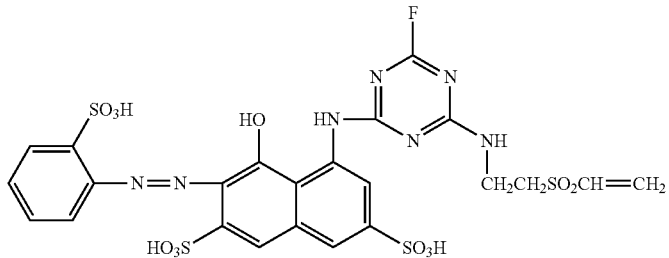

(206)
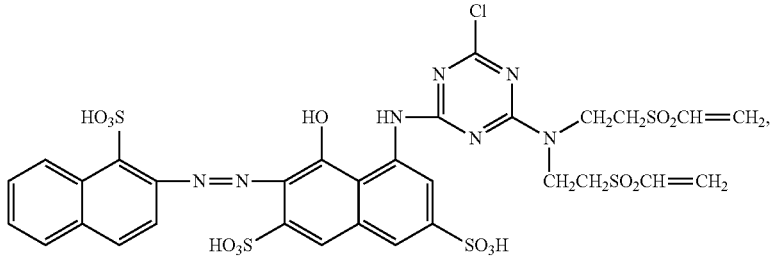

(207)
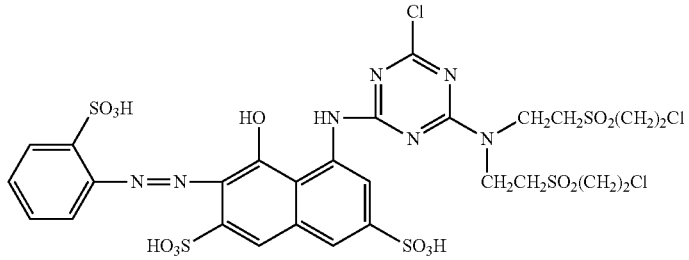

In one embodiment the dye mixture according to the present invention comprises as the dye of formula (2) the dye of formula (201) and/or (202).

The dyes of formulae (1) and (2) are known in some cases, or they can be prepared in accordance with processes known per se, such as by customary diazotization, coupling and condensation reactions as described, for example, in U.S. Pat. No. 4,341,699, GB-A-1576237, U.S. Pat. No. 4,754,023, EP-A-94055 and U.S. Pat. No. 5,298,607.

A variant of the processes known per se comprises first condensing one of (i) the amino substituted azo compound and (ii) the amine carrying the reactive group with (iii) cyanuric halide, for example, cyanuric chloride or cyanuric fluoride, and reacting the resulting reaction product with the other of the (i) amino substituted azo dye and (ii) the amine carrying the reactive group, which has been condensed beforehand with cyanuric halide. Alternatively, the precursor of (i) the amino azo dye is condensed with the primary condensation product of (ii) the amine carrying the reactive group and (iii) cyanuric halide, and the resulting secondary condensation product is subsequently diazotated and coupled in analogy to the process described in Example 3 of U.S. Pat. No. 5,298,607 (columns 29 and 30).

The condensation reactions between (i) the amino substituted azo compound, the precursor of (i), (ii) the amine carrying the reactive group and cyanuric halide are generally carried out analogously to known processes, usually in aqueous solution at temperatures of, for example, from 0 to 70° C. and a pH of, for example, from 3 to 10.

The end product can optionally also be subjected to a transformation reaction. Such a transformation reaction is, for example, the conversion of a vinylatable reactive group —$SO_2$—Y, —$SO_2$—$Y_1$, —$SO_2$—$Y_2$ and —$SO_2$—$Y_3$ into its vinyl form by treatment with dilute sodium hydroxide solution, such as, for example, the conversion of the β-chloroethylsulfonyl radical or β-sulfatoethylsulfonyl radical into the vinylsulfonyl radical. Such reactions are known per se. Those transformation reactions are generally affected in a neutral to alkaline medium at a temperature of, for example, from 20 to 70° C., at a pH of, for example, from 6 to 14.

The amine carrying the reactive group of formula

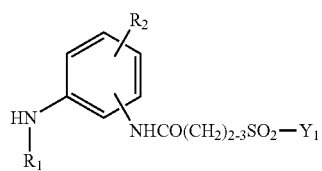

(4)

wherein the radicals $R_1$, $R_2$ and $Y_1$ each have the meanings and preferred meanings given above, can be prepared, for example, in accordance with the process described in WO-A-2012136428. The amine of formula (4) is required for the preparation of the dyestuff of formula (1), wherein m is the number 1.

Furthermore, the present invention relates to the novel dyestuffs of formula mills, e.g. ball mills or pin mills, as well as in kneaders or mixers. The dye mixtures according to the invention can also be prepared, for example, by dissolving the reactive dyes of formulae (1) and (2) directly in the dye bath or the printing medium. The dye of formula (1) and the dye of formula (2) are present in the dye mixture according to the present invention in a ratio by weight of, for example, from 5:95 to 95:5, 20:80 to 80:20, 30:70 to 70:30, 40:60 to 60:40 or 50:50. In one embodiment, the dye of formula (1) and the dye of formula (2) are present in the dye mixture in a ratio by weight of from 20:80 to 50:50, preferably of 30:70.

The reactive dyes of formulae (1) and (2) and accordingly also the dye mixtures according to the invention may comprise further additives, for example sodium chloride or dextrin.

If desired, the reactive dyes of formulae (1) and (2) and the dye mixtures according to the invention may comprise further auxiliaries which, for example, improve handling or increase storage stability, such as buffers, dispersants or anti-dusts. Such auxiliaries are known to the person skilled in the art.

The dye mixture and the dye according to the invention are suitable for the dyeing and printing of an extremely wide variety of materials, especially hydroxy-group-containing or nitrogen-containing fibre materials. Examples thereof are paper, silk, leather, wool, polyamide fibres and polyurethanes as well as, especially, cellulosic fibre materials of all kinds. Such fibre materials are, for example, natural cellulose fibres, such as cotton, linen and hemp, as well as cellulose and regenerated cellulose. The dye mixtures and dyes according to the invention invention are also suitable for the dyeing or printing of hydroxy-group-containing fibres that are contained in blend fabrics, for example mixtures of cotton with polyester fibres or polyamide fibres.

The said textile fibre material may be in an extremely wide variety of processing forms, such as, for example, in the form of fibres, yarn, woven fabric or knitted fabric.

Accordingly, the present invention relates also to a method for the dyeing or printing of hydroxy-group-containing or nitrogen-containing fibre materials, especially cellulosic fibre materials, which method comprises using at least one dye, for example one, two or three dyes, preferably one dye, of the above-mentioned formula (1), together with at least one dye, for example one, two or three dyes, preferably one dye, of the above-mentioned formula (2),

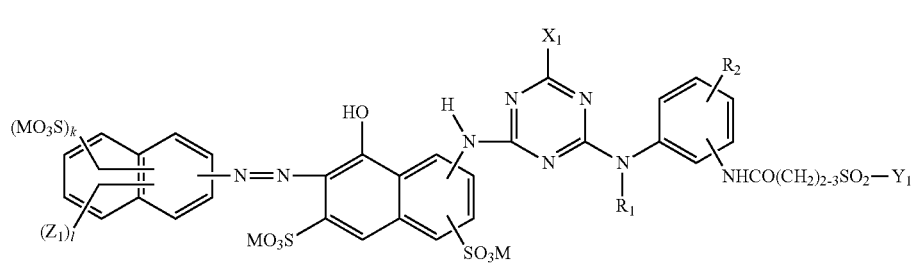

(1b)

wherein the radicals $R_1$, $R_2$, $X_1$, $Y_1$, M, k and I each have the meanings and preferred meanings given above. In an interesting embodiment of the dyestuff of formula (1b) $R_2$ means sulfo. In another interesting embodiment the diazo component of the dye of formula (1b) is a naphthyl radical.

The dye mixture according to the invention can be prepared, for example, by mixing the individual dyes together. The mixing procedure is affected, for example, in suitable wherein $R_1$, $R_2$, $Q_1$, $Q_2$, $X_1$, $X_2$, M $Y_1$, $Y_2$, $Y_3$, $Z_1$, $Z_2$, M, k, I, n and q each have the meanings and preferred meanings defined above.

The dye mixtures or dyes according to the invention are suitable for customary dyeing and printing methods and can be applied to the fibre material and fixed thereto in a wide variety of ways, especially in the form of aqueous dye solutions or print pastes.

The method for dyeing and printing of hydroxy-group-containing or nitrogen-containing fibre materials according to the invention can be carried out in accordance with customary dyeing and printing methods, for example, according to the so-called cold pad-batch process, in which the dye is applied, together with the alkali, on the padder and is then fixed by storage for several hours at about room temperature, for example, from 25 to 35° C. Preferably, the method for dyeing and printing according to the invention is carried out according to the exhaust-dyeing method, in which the goods are impregnated with aqueous, optionally salt-containing dye solutions, and the dyes are fixed after an alkali treatment or in the presence of alkali, optionally under the action of heat.

The dye liquors or print pastes, in addition to containing water and the dyes, may also comprise further additives, for example shading dyes known per se, salts, buffer substances, wetting agents, anti-foams, levelling agents or agents that influence the properties of the textile material, for example softeners, additives for flame-resistant finishes or dirt-, water- or oil-repellants, as well as water-softeners and natural or synthetic thickeners, e.g. alginates or cellulose ethers.

The amounts in which the dye mixtures or the individual dyes are used in the dye baths or print pastes can vary within wide limits in dependence upon the desired depth of shade; in general, amounts of from 0.01 to 15% by weight, especially from 0.1 to 10% by weight, based on the goods being dyed or on the print paste, have proved advantageous.

The inventive dye mixtures used in accordance with the method of the present invention are distinguished by high and uniform colour build-up, good exhaustion and fixing behaviour, good constancy of shade even in different concentrations, a low sensitivity to various dyeing parameters and, in particular, very good combinability. Dyeing times can be reduced. Furthermore, they have sufficient substantivity and at the same time have a very good ease of washing off of unfixed dye and can advantageously be applied at short liquor ratios, for example, at a liquor ratio of from 1:4 to 1:6, preferably, 1:6. The dyeings and prints produced in accordance with the method of the invention exhibit brilliant shades of very good fastness properties, such as fastness to washing, to water, to sea water, to cross-dyeing and to perspiration, as well as good fastness to chlorine, to pleating, to hot-pressing and to rubbing, and good reproducibility.

The dye mixtures and dyes according to the invention are also suitable as colorants for use in recording systems. Such recording systems are, for example, commercially available ink-jet printers for paper or textile printing, or writing implements, such as fountain pens or ball-point pens, and especially ink-jet printers. For that purpose, the dye mixture according to the invention or the dyes according to the invention are first converted into a form suitable for use in recording systems. A suitable form is, for example, an aqueous ink comprising at least one dye of the dye mixture according to the invention as colorant. The inks can be prepared in customary manner by mixing together the individual constituents customary in ink-jet printing in the desired amount of water. Conveniently, individual inks, comprising at least one dye of formula (1) and (2) are used in a multi color ink-jet printer and mixing is affected on the substrate by digital printing. For example, one ink comprises a dye of formula (1), and another ink comprises a dye of formula (2), or one ink comprises a dye of formula (1) and a dye of formula (2).

Examples of substrates that come into consideration for ink-jet printing, in addition to paper or plastics films, include the above-mentioned hydroxy-group-containing or nitrogen-containing fibre materials, especially cellulosic fibre materials. The substrates are preferably textile fibre materials.

The following Examples serve to illustrate the invention. Unless otherwise indicated, temperatures are given in degrees Celsius, parts are parts by weight and percentages relate to percent by weight. Parts by weight relate to parts by volume in a ratio of kilograms to litres.

Example 1: Exhaust Dyeing—Build-Up: A cotton tricot fabric is introduced at 60° C. into an aqueous dyebath with a liquor ratio of 1:10 which contains the amount of either a 20:80 mixture by weight of the dyestuffs of formulae (104) and (201), a 30:70 mixture by weight of the dyestuffs of formulae (103) and (202), and as a reference the single dyestuff of formula (104), or the single dyestuff of formula (201), and sodium chloride as indicated in Table 1.

TABLE 1

Composition of dyebaths 1 to 6 containing a 20:80 mixture of the dyestuffs of formulae (104) and (201), a 30:70 mixture of the dyestuffs of formulae (103) and (202), the single dyestuff of formula (104), or the dyestuff of formula (201).

|  | dyebath | | | | | |
| --- | --- | --- | --- | --- | --- | --- |
|  | 1 | 2 | 3 | 4 | 5 | 6 |
| %* of dye mix or dye | 0.5 | 1.0 | 2.0 | 4.0 | 6.0 | 8.0 |
| sodium chloride [g/l] | 40 | 50 | 60 | 90 | 100 | 100 |
| sodium carbonate [g/l] | 10 | 12 | 14 | 18 | 18 | 18 |

*% of dyestuff mixture or dyestuff is with respect to the weight of the cotton fabric After 45 minutes at 60° C. calcined sodium carbonate is added in the amount given in Table 1. Dyeing is continued for 45 minutes. The dyed goods are then rinsed with water, soaped and rinsed again and then dried.

The tinctorial strengths of the red dyeings obtained with the dyeing liquors 1 to 6 are measured photospectrometrically. Table 2 shows the build-up properties of the mixture of the dyestuffs of formulae (104) and (201), the mixture of the dyestuffs of formulae (103) and (202), and the single dyes of formula (104) and (201) as a reference. The dyestuff mixtures according to the present invention shows very good build-up properties in comparison to the single dyestuff components. The tinctorial strengths of the dyeings are given in units of RD (="Reference Depth"), a quantity obtained by an internal test method that specifies the colour depth and correlates with the standard depth SD according to ISO 105-A-1984 (E), page 4.

TABLE 2

Build-up: dependence of reference depth (RD) from dyestuff concentration

|  | % of dyestuff | | | | | | |
| --- | --- | --- | --- | --- | --- | --- | --- |
|  | 0 | 0.5 | 1.0 | 2.0 | 4.0 | 6.0 | 8.0 |
| RD dyestuff mix 20:80 (104) & (201) | 0 | 0.28 | 0.52 | 0.99 | 1.66 | 2.07 | 2.19 |
| RD dyestuff mix 30:70 (103) & (202) | 0 | 0.26 | 0.51 | 0.97 | 1.68 | 2.08 | 2.29 |
| RD dyestuff (104) | 0 | 0.26 | 0.51 | 0.93 | 1.58 | 1.90 | 1.96 |
| RD dyestuff (201) | 0 | 0.18 | 0.36 | 0.69 | 1.34 | 1.72 | 1.87 |

The data of Table 2 demonstrate that the fabric dyed with the inventive dyestuff mixture exhibits superior build-up properties.

Example 2: Exhaust Dyeing—Fastness: A bleached cotton tricot fabric is introduced at 60° C. into an aqueous dyebath with a liquor ratio of 1:6 which contains 55 g/l of sodium chloride, and 2.0% of a 20:80 mixture by weight of the dyestuffs of formula (104) and (201), 2.2% of the dyestuff of formula (104), or 2.9% the dyestuff of formula (201). After 45 minutes at 60° C. 16.0 g/l of calcined sodium carbonate are added to the dyebath. Dyeing is continued for 45 minutes. The dyed fabric is taken out of the dyeing liquor and submitted to a washing treatment by rinsing the fabric for 10 minutes in a water bath with a liquor ratio of 6:1 at 60° C. This washing treatment is repeated another two times. Red shaded fabrics with a reference depth (RD) of 1.0 which corresponds to a colour depth of 1/1 SD (standard depth according to ISO 105-A-1984 (E)) are obtained. The degree of fixation of the inventive mixture of the dyestuffs of formula (104) and (201) is 75%, whereas the degree of fixation of its dyestuff components of formula (104) and formula (201) is 76% and 66%, respectively. It is surprising that the good degree of fixation of the dye of formula (104) is preserved in the mixture, although it is only used in an amount of 20%.

The washed fabrics are subjected to the following colour fastness tests:
  (a) Washing C1S at 60° C. according to ISO 105-C06,
  (b) Water severe according to ISO 105-E01,
  (c) Perspiration alkaline according to ISO 105-E04,
  (d) Perspiration acid according to ISO 105-E04.

Changes in colour are determined according to the Blue Scale. Higher ratings indicate superior fastness properties. The data of Tables 3, 4 and 5 demonstrate that the fabric dyed with the inventive dyestuff mixture exhibit good fastness properties.

TABLE 3

Fastness properties of mix 20:80 of dyestuffs of formulae (104) and (201)

| Wash treatment | Dyestuff mix 20:80 (104) & (201) | | | | | |
| --- | --- | --- | --- | --- | --- | --- |
| | CA | CO | PA6.6 | PES | PAN | WO |
| (a) Washing C1S at 60° C. | 4-5 | 4 | 4-5 | 5 | 5 | 4-5 |
| (b) Water severe | 4 | 3 | 4 | 4-5 | 4 | 4 |
| (c) Perspiration alkaline | 4-5 | 2-3 | 4 | 4-5 | 4 | 4-5 |
| (d) Perspiration acid | 4-5 | 2-3 | 3-4 | 4-5 | 4 | 4 |

TABLE 4

Fastness properties of dyestuff of formula (104)

| Wash treatment | Dyestuff (104) | | | | | |
| --- | --- | --- | --- | --- | --- | --- |
| | CA | CO | PA6.6 | PES | PAN | WO |
| (a) Washing C1S at 60° C. | 4-5 | 3-4 | 4-5 | 4-5 | 5 | 4-5 |
| (b) Water severe | 3-4 | 2 | 3 | 3-4 | 3 | 3 |
| (c) Perspiration alkaline | 4-5 | 2 | 3 | 4 | 3-4 | 4 |
| (d) Perspiration acid | 4-5 | 2 | 2-3 | 3-4 | 3 | 3 |

TABLE 5

Fastness properties of dyestuff of formula (201)

| Wash treatment | Dyestuff (201) | | | | | |
| --- | --- | --- | --- | --- | --- | --- |
| | CA | CO | PA6.6 | PES | PAN | WO |
| (a) Washing C1S at 60° C. | 4-5 | 4-5 | 4-5 | 4-5 | 5 | 4-5 |
| (b) Water severe | 4-5 | 3 | 4 | 4-5 | 4 | 4-5 |
| (c) Perspiration alkaline | 4-5 | 2-3 | 4-5 | 4-5 | 4 | 4-5 |
| (d) Perspiration acid | 4-5 | 2-3 | 4 | 4-5 | 4 | 4 |

Examples 3 to 13: Red shaded fabrics with good fastness properties are likewise obtained by repeating the above exhaust dyeing process of Example 2, but using instead of a 20:80 mixture of the dyestuffs of formula (104) and (201) the following dye mixtures of Table 6, which exhibit good build-up properties and good fixation rates.

TABLE 6

Examples 3 to 13

| Example | Dyestuff of formula (1) | Dyestuff of formula (2) | Ratio of dyestuffs (1):(2) [parts by weight] |
| --- | --- | --- | --- |
| 3 | (101) | (202) | 20:80 |
| 4 | (102) | (201) | 20:80 |
| 5 | (104) | (201) | 50:50 |
| 6 | (104) | (201) | 30:70 |
| 7 | (105) | (202) | 20:80 |
| 8 | (106) | (201) | 20:80 |
| 9 | (107) | (201) | 30:70 |
| 10 | (108) | (201) | 20:80 |
| 11 | (109) | (201) | 20:80 |
| 12 | (103) | (202) | 20:80 |
| 13 | (104) | (201) | 40:60 |

Printing Procedure I 3 parts of a 20:80 mixture of the dyestuffs of formula (104) and (201) are sprinkled, with rapid stirring, into 100 parts of a stock thickener containing 50 parts of 5% sodium alginate thickener, 27.8 parts of water, 20 parts of urea, 1 part of sodium m-nitrobenzenesulfonate and 1.2 parts of sodium hydrogen carbonate. The print paste so obtained is used to print a cotton fabric, and the resulting printed material is dried and steamed in saturated steam for 2 minutes at 102° C. The printed fabric is then rinsed, if desired soaped at the boil and rinsed again, and subsequently dried.

Printing Procedure II (a) Mercerised cotton-satin is padded using a liquor containing 30 g/l of sodium carbonate and 50 g/l of urea (liquor uptake 70%) and dried.

(b) The cotton-satin pre-treated according to Step (a) is printed using an aqueous ink containing 15% of a 20:80 mixture of the dyestuffs of formula (104) and (201), 15% of 1,2-propylene glycol and 70% of water using a drop-on-demand inkjet head (bubble jet). The print is dried completely and fixed in saturated steam at 102° C. for 8 minutes, cold-rinsed, washed off at the boil, rinsed again and dried.

What is claimed is:

1. A dye mixture comprising at least one dye of formula

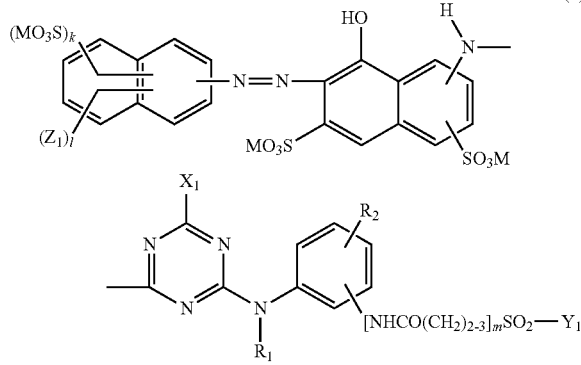

(1)

and at least one dye of formula

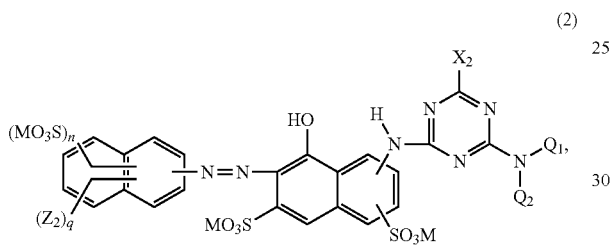

(2)

wherein
$R_1$ is hydrogen or $C_1$-$C_4$ alkyl,
$R_2$ is hydrogen, $C_1$-$C_4$ alkyl, $C_1$-$C_4$ alkoxy or sulfo,
$Q_1$ is a fibre-reactive radical of formula —(CH$_2$)$_{2-3}$—SO$_2$—Y$_2$ (3a) or —(CH$_2$)$_{2-3}$—O—(CH$_2$)$_{2-3}$—SO$_2$—Y$_3$ (3b), $Q_2$ has the meaning of $Q_1$, or is hydrogen or $C_1$-$C_4$ alkyl,
$X_1$ and $X_2$ are each independently of the other halogen, 3-carboxypyridin-1-yl or 3-carbamoylpyridin-1-yl,
$Y_1$, $Y_2$ and $Y_3$ are each independently of the others vinyl or a radical —CH$_2$—CH$_2$—U and U is a group removable under alkaline conditions,
$Z_1$ and $Z_2$ are each independently of the other —SO$_2$—Y, wherein Y is vinyl or a radical —CH$_2$—CH$_2$—U and U is a group removable under alkaline conditions,
M is hydrogen, an alkali metal or one equivalent of an alkaline earth metal,
k and n are each independently of the other the number 0, 1 or 2,
l and q are each independently of the other the number 0 or 1,
m is the number 0 or 1, and
wherein the diazo component of the dye of formula (1) and the diazo component of the dye of formula (2) each independently of the other are a benzene radical or a naphthyl radical.

2. A dye mixture according to claim 1, wherein the diazo component of the dye of formula (1) and the diazo component of the dye of formula (2) each are a naphthyl radical.

3. A dye mixture according to claim 1, wherein l and q each are the number 0.

4. A dye mixture according to claim 1, wherein m is the number 0.

5. A dye mixture according to claim 1, wherein the dye of formula (1) is a dye of formula

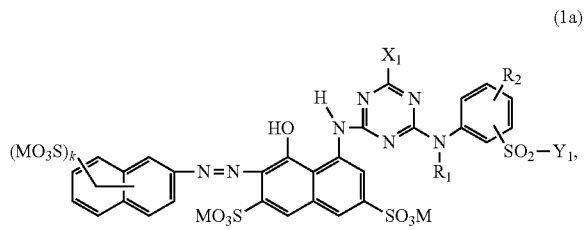

(1a)

wherein
$R_1$, $R_2$, $X_1$, $Y_1$, M and k each have the meanings given in claim 1.

6. A dye mixture according to claim 1, wherein the dye of formula (2) is a dye of formula

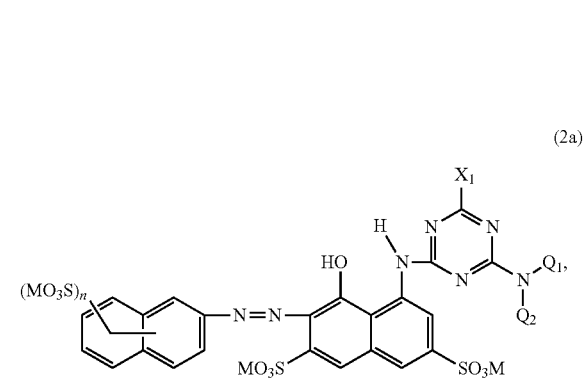

(2a)

wherein
$Q_1$, $Q_2$, $X_2$, M and n each have the meanings given in claim 1.

7. A dye mixture according to claim 1, wherein k and n each independently of the other are the number 1 or 2.

8. A dye mixture according to claim 1, wherein $R_2$ is hydrogen or sulfo.

9. A dye mixture according to claim 1, wherein $X_1$ and $X_2$ each are halogen.

10. A dye mixture according to claim 1, wherein $Y_1$, $Y_2$ and $Y_3$ are each independently of the others vinyl or a radical —CH$_2$—CH$_2$—U and U means Cl or —OSO$_3$M, wherein M has the meanings given in claim 1.

11. A dye mixture according to claim 1, wherein $Q_1$ and $Q_2$ are each a fibre-reactive radical of formula (3a).

12. A method for the dyeing or printing of hydroxy-group-containing or nitrogen-containing fibre materials, which method comprises contacting the fibre material with a dye mixture according to claim 1.

13. A method according to claim 12, wherein the fibre material comprises cellulosic fibre material.

14. A reactive dye of formula

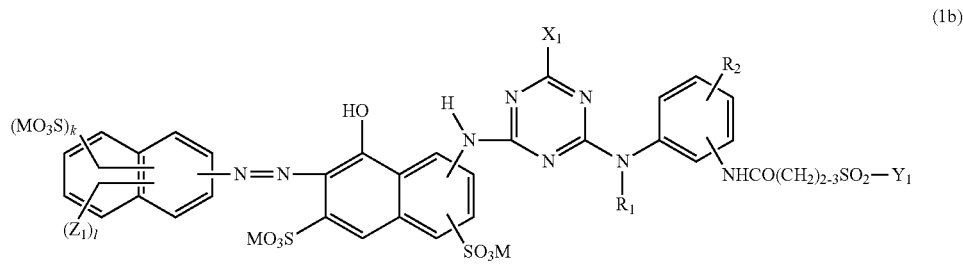

wherein
$R_1$ is hydrogen or $C_1$-$C_4$alkyl,
$R_2$ is hydrogen, $C_1$-$C_4$ alkyl, $C_1$-$C_4$ alkoxy or sulfo,
$X_1$ is halogen, 3-carboxypyridin-1-yl or 3-carbamoylpyridin-1-yl,
$Y_1$ is vinyl or a radical —$CH_2$—$CH_2$—U and U is a group removable under alkaline conditions,
$Z_1$ is —$SO_2$—Y, wherein Y is vinyl or a radical —$CH_2$—$CH_2$—U and U is a group removable under alkaline conditions,
M is hydrogen, an alkali metal or one equivalent of an alkaline earth metal,
k is the number 0, 1 or 2,
l is the number 0 or 1, and wherein the diazo component of the dye of formula (1b) is a benzene radical or a naphthyl radical.

15. The reactive dye of claim 14, wherein $R_2$ is sulfo.

16. A method for the dyeing or printing of hydroxy-group-containing or nitrogen-containing fibre materials, which method comprises contacting the fibre material with the reactive dye according to claim 15.

17. The method according to claim 16, wherein the fibre material comprises cellulosic fibre material.

18. An aqueous ink comprising the dye mixture according to claim 1.

19. An aqueous ink comprising the reactive dye according to claim 15.

* * * * *